United States Patent [19]

Kleosch et al.

[11] Patent Number: 5,019,448

[45] Date of Patent: May 28, 1991

[54] COMPOSITE PANEL

[75] Inventors: Wilhelm Kleosch; Dietmar Plöbst, both of Kaprun, Austria

[73] Assignee: Intec Plastic Products Gesellschaft m.b.H., Piesendorf, Austria

[21] Appl. No.: 234,950

[22] Filed: Aug. 22, 1988

[30] Foreign Application Priority Data

Aug. 24, 1987 [AT] Austria ................................ 2106/87

[51] Int. Cl.$^5$ ............................................. B32B 27/08
[52] U.S. Cl. ..................................... 428/332; 428/518; 428/520; 264/176.1
[58] Field of Search ................ 428/332, 518, 520, 172

[56] References Cited

U.S. PATENT DOCUMENTS 4,029,615 6/1977 Kamens et al. ................ 521/139 X
4,272,585 6/1981 Strassel ............................ 428/424.6

FOREIGN PATENT DOCUMENTS 0060421 9/1982 European Pat. Off. .

Primary Examiner—P. C. Sluby
Attorney, Agent, or Firm—Wenderoth, Lind & Ponack

[57] ABSTRACT

A composite panel from which an internal bathtub casing can be manufactured by deep drawing, in which a coating of poly(methyl methacrylate) (PMMA, acrylic glass) is placed on a substrate of acrylonitrile-butadiene-styrene (ABS) in particular, which coating is provided with a top coat which consists of 30-70 weight % polyvinylidene fluoride (PVDF), and the remainder of poly(methyl methacrylate).

2 Claims, No Drawings

COMPOSITE PANEL

FIELD AND BACKGROUND OF THE INVENTION

The invention relates to a composite panel from which an internal bathtub casing can be manufactured by deep drawing, whereby a coating of poly(methyl methacrylate) (PMMA, acrylic glass) is placed on a substrate of acrylonitrile-butadiene-styrene (ABS) in particular.

EP-A-0 225 500 discloses an option for fabricating internal bathtub casings, the quality of which is approximately equivalent to that of poured acrylic glass, by appropriate selection of the melt index of an acrylic layer coextruded with a substrate made of ABS. A measure of the quality of the insert in this case is the number of filling cycles with hot and cold water that the bathtub can be subjected to according to the relevant CEN specifications until the first fine hairline cracks are perceptible. In this type of test, the bathtub is filled alternately with hot water of 95° C. and cold water of 12° C., whereby the test conditions are precisely specified.

The invention proceeds from the knowledge that the specified tests are not sufficiently realistic in this respect, because they do not take into account the effect of aggressive solvents, permitted in many countries as a component of cleaning agents, on the appearance and the mechanical properties of the internal casing. The invention thus had as its object the raising of the chemical resistance of internal bathtub casings at the lowest possible additional cost, without losing other features of the standard already achieved according to EP-A-0 225 500.

One approach to this problem was to provide the coating of acrylic glass with a top coat which consists of 30–70 weight % polyvinylidene fluoride (PVDF), and the remainder of poly(methyl methacrylate).

Surprisingly, a thickness substantially less than 0.5 mm, for example, even of 0.1 mm, is sufficient for a coating layer. Despite the extremely low thickness of the top coat, the manufacture of the novel composite panel succeeds with the use of an extrusion process, if, as described in EP-A-0 225 500, the substrate, the coating, and the top coat are coextruded through a flat sheet die, whereby the materials forming the three layers are fed directly into the flat sheet die through different channels, the width of which corresponds to the final product.

Both the good chemical properties and the extrudability of PVDF are known per se; however, if one were to apply a top coat of pure PVDF to the acrylic glass coating of the composite panel (cf. DE-A 2938462), then the brilliance conferred by the acrylic glass to the composite panel is lost, because pure PVDF is optically not transparent, but rather merely translucent with an inherent milky color. It was altogether surprising that the top coat is given a brilliance and hardness, equal to that of a panel without a top coat, by the proposed addition of methacrylate. It was also totally unexpected that the application of a top coat of this slight thickness substantially increases the number of filling cycles according to the test described above; this is probably attributable to the fact that a PVDF employed specifically for this purpose has an elongation at break of 600% so that the mixture embodying the invention is less brittle and has a lower tendency for forming hairline cracks than pure acrylic glass. The observed excellent bonding between the top coat and the acrylic glass coating is attributed to the fact that the top coat consists to a large extent of the same material as the coating.

Further details of the invention will be more fully described hereinbelow in one embodiment of the invention.

DESCRIPTION OF AN EMBODIMENT OF THE INVENTION

The novel composite panel may, for example, consist of a bearing panel several millimeters thick and consisting optionally of acrylate-reinforced ABS. The next coat is a 1- to 2-mm-thick layer of ABS, which forms the substrate for a coating of acrylic glass (PMMA) 1.2 mm thick. The novel mixture of acrylic glass and PVDF serves as the top coat.

PVDF employed in the sense of the invention is marketed, for example, by Pennwalt under the name Kynar ® 740/741. This material has a melt viscosity of 21,000 poise at a shear rate of 100 sec$^{-1}$ at 232° C.

The efforts to optimize the mixture ratio in the top coat are not yet completed, but substantial improvements over the prior art described in EP-A-0 225 500 have already been achieved with values of 60% PVDF and 40% PMMA; these improvements more than justify the cost of the relatively expensive PVDF and the application of an additional layer.

What is claimed is:

1. A composite panel from which an internal bathtub casing can be manufactured by deep drawing, which panel comprises an acrylonitrile-butadiene-styrene substrate, a coating of poly(methyl methacrylate) on said substrate, and a top coat having a thickness of from more than 0.1 mm to less than 0.5 mm on said coating, which top coat consists of a mixture of 30–70 weight % of polyvinylidene fluoride and the remainder of poly(methyl methacrylate).

2. An internal bathtub casing manufactured by deep drawing a composite panel, which panel comprises an acrylonitrile-butadiene-styrene substrate, a coating of poly(methyl methacrylate) on said substrate, and a top coat having a thickness of from more than 0.1 mm to less than 0.5 mm on said coating, which top coat consists of a mixture of 30–70 weight % of polyvinylidene fluoride and the remainder of poly(methyl methacrylate).

* * * * *